Feb. 28, 1961

JU CHIN CHU 2,973,189

FRACTIONATING COLUMNS

Filed Feb. 28, 1956

INVENTOR.
JU CHIN CHU
BY
Robert D. Spindle
ATTORNEY

Feb. 28, 1961    JU CHIN CHU    2,973,189
FRACTIONATING COLUMNS
Filed Feb. 28, 1956    3 Sheets-Sheet 2

INVENTOR.
JU CHIN CHU
BY
Robert D. Spindle
ATTORNEY

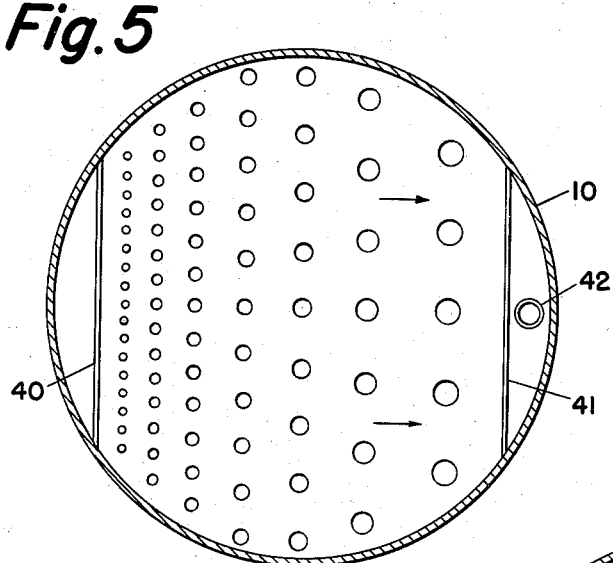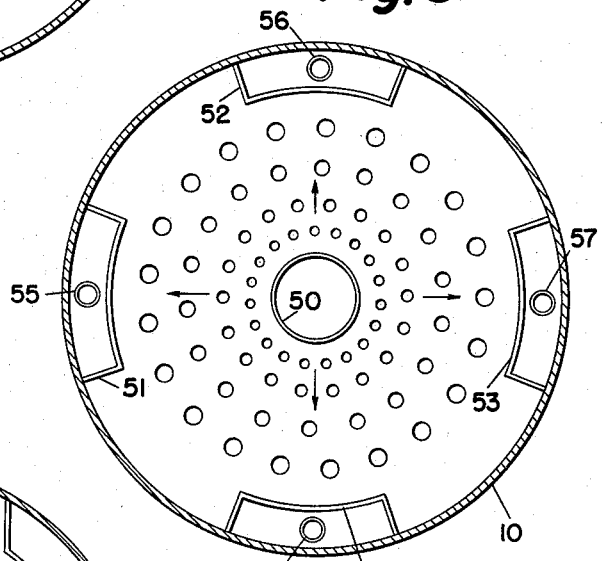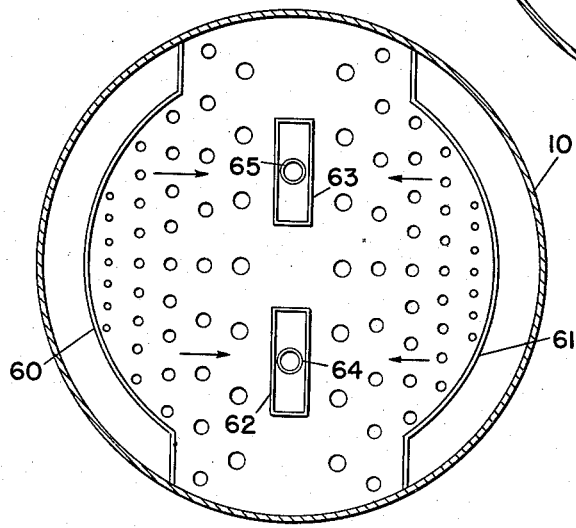

_United States Patent Office_

2,973,189
Patented Feb. 28, 1961

2,973,189

FRACTIONATING COLUMNS

Ju Chin Chu, 34 Linden St., Garden City, N.Y.

Filed Feb. 28, 1956, Ser. No. 568,338

5 Claims. (Cl. 261—114)

This invention relates to apparatus for conducting diffusional operations such as distillation, gas absorption and extraction, and more particularly is directed to improved plates for fractionating columns.

In addition to bubble plate and packed columns, sieve plate columns have been used for a long time in effecting separation of the components of a mixture by distillation, absorption, extraction and the like. It is known that sieve plate columns are inexpensive and have high efficiency when operated under the specific conditions for which they are designed; but it is also known that this type of column has very little flexibility so that any particular sieve plate column is generally incapable of effective use under a wide variety of operation conditions. This lack of flexibility is a result of the hydraulic gradient of the downflowing liquid as it passes across each plate. The depth of the liquid inevitably is greater at the liquid inlet than it is at the exit portion of the plate, and this tends to cause the liquid to flow through the perforations which are nearer the inlet instead of flowing evenly across the plate to the exit weir. This being the case, to avoid undesirable liquid downflow near the inlet weir, it is necessary to maintain the liquid level on the plate at a lower level than would be desired from the standpoint of maximizing column capacity.

Due to the tendency for liquid downflow to occur as described above, sieve plate columns heretofore employed have been suitable only when the fractionation is conducted within a narrow range of operating conditions. Large diameter columns are particularly limited in flexibility due to the greater difference in depth of liquid between the inlet and exit zones of each plate. The limitations inherent in sieve plate columns of conventional construction have required that each column be carefully designed for a specific set of operating conditions and operated close to those conditions in order to give satisfactory results.

The present invention is directed to and provides improved fractionating columns having wider flexibility and greater operating stability than columns heretofore employed. According to the invention the size of the holes and the hole spacing are arranged in a manner so as to minimize the adverse effect of hydraulic gradient. This is done, in one embodiment of the invention, by increasing, in the direction of liquid flow, the ratio of perforated area to total area, i.e. to the sum of perforated area and unperforated area, and increasing the ratio of perforated area to unperforated area. Both of these ratios are increased in this embodiment; where the latter ratio is referred to subsequently, it will be understood that the same disclosure applies to the ratio of perforated area to total area. As subsequently shown, increase in these ratios in the direction of liquid flow serves to equalize the tendency for liquid downflow through perforations, for the various portions of the plate. Such equalization permits the liquid level to be maintained at a higher level, without downflow through the perforations, than in the case where the ratios are generally the same across the plate.

When the perforated area is properly distributed across the plate according to the invention, the percentage amount of perforated area can be less near the inlet weir than in the conventional case where the perforated area is uniformly distributed across the plate; as a result, greater liquid head than in the conventional case can be maintained near the inlet weir without downflow of liquid there. The total perforated area for a plate need not be less however than in the conventional case, since the percentage amount of perforated area near the exit weir, where the tendency for liquid downflow through perforations is not as great, can be greater than in the conventional case.

The ratio of perforated area to unperforated area can be increased in the direction of liquid flow in any of a number of suitable ways. Thus, in a square plate having a plurality of parallel rows of perforations extending across the plate in a direction generally perpendicular to two of the column walls and to the direction of liquid flow, the rows being equally spaced from each other, the ratio can be increased in the direction of liquid flow by (1) increasing the number of perforations per row, the area of the individual perforations all being the same, or (2) increasing the area of the individual perforations, the number of perforations per row being the same for all rows, or (3) any other suitable combination of perforation area and numbers of perforations per row. For any other shape of plate, a person skilled in the art, in the light of the present specification, can choose perforation sizes and arrangements which give the desired increase in ratio of perforated area to unperforated area.

The manner of calculation of the ratio of perforated to unperforated area, and of the variation of such ratio across the plate may be illustrated by the following example, which assumes a plate having a plurality of parallel rows of perforations extending across the plate in a direction perpendicular to the direction of liquid flow, the rows being so spaced that an imaginary line parallel to the rows can be drawn between each adjacent pair of rows, dividing the plate into a plurality of sections of equal area, A, each containing one row of perforations. To determine the ratio of perforated to unperforated area for any row, the aggregate cross sectional area of the perforations in the row is divided by the difference between A and that aggregate cross sectional area, the quotient obtained being the desired ratio. For other arrangements of perforations, different methods of calculation must be employed, but such methods are within the ability of a person skilled in the art, in the light of the present specification.

In the embodiment of the invention wherein the ratio of perforated to unperforated area increases in the direction of liquid flow, the advantages of the invention are obtained in accordance with a mathematical relationship which exists between that ratio and liquid head, when the tendency for liquid downflow through perforations is equalized across the plate, and when certain other conditions exist. The latter conditions are that vapor density, pressure drop of rising gas through liquid on the plate, and upward force exerted on liquid at the perforations by surface tension be sufficiently small, in comparison with liquid density, pressure drop of rising gas through the plate itself, and other forces exerted on the liquid, respectively, to have an unsubstantial effect on the relationship; these conditions exist in many distillation systems. The mathematical relationship for equalization of liquid downflow tendencies under these conditions, is as follows:

$$\frac{R_n}{R_1} = \left[\frac{H_1}{H_n}\right]^{3/2}$$

where $R_1$ is the ratio of perforated to total area at a row near the inlet weir, $R_n$ is the same ratio at a row farther from the inlet weir, $H_1$ is the product of liquid height and liquid density at the row near the inlet weir, and $H_n$ is that same product at the row farther from the inlet weir. Since the right hand side of the equation is generally greater than one, the liquid head being greater near the inlet weir, the left hand side must also be greater than one, if the tendency for liquid downflow across the plate is to be equalized. Therefore, the ratio of perforated area must be greater at the row farther from the inlet weir, i.e. must increase in the direction of liquid flow.

In another embodiment of the invention, wherein the effect of surface tension is not sufficiently small to be unsubstantial, the equalization of the tendency for liquid downflow through perforations can be accomplished by increasing the size of the individual perforations in the direction of liquid flow, without changing the ratio of perforated area to unperforated area in the direction of liquid flow, or even while decreasing that ratio in the direction of liquid flow. In this embodiment, the surface tension at the smaller perforations makes it more difficult for liquid to flow downwardly through those perforations than through the larger perforations near the exit weir, and thus counteracts the tendency for liquid to flow through perforations near the inlet weir because of the greater liquid head there. An increase in perforation size without an increase in ratio of perforated area to unperforated area can be accomplished for example by decreasing the number of holes per row in the direction of liquid flow, or in any other suitable manner.

The present invention provides a novel manner of obtaining higher levels of liquid on plates, and consequently higher rates of throughput, without downflow of liquid through perforations, than are possible in conventional operation. The avoidance of liquid downflow through perforations in one portion of the plate, i.e. near the inlet weir, avoids uneven vapor distribution caused, when such downflow occurs, by selective flow of vapors through other portions of the plate where liquid downflow is not occurring. Some unevenness of vapor distribution across the plate cross section may occur in the practice of one embodiment of the invention, as a result of the fact that a greater ratio of perforated area to unperforated area is provided in those parts of the plate where the liquid head is less. However, such unevenness is slight enough in most cases that it does not represent a substantial disadvantage. On the other hand, the unevenness of vapor distribution which occurs in conventional operation when there is downflow of liquid through perforations near the inlet weir, and which is avoided according to the present invention, is often of sufficient magnitude to represent a great disadvantage, making operation above certain throughput levels impracticable. According to the invention, operation above such levels is possible without liquid downflow through perforations, and without significant unevenness of vapor distribution.

Specific embodiments of the invention are described hereinafter in connection with the accompanying drawings in which:

Figs. 5, 6 and 7 are plan views of sieve plates illustrating various other embodiments of the invention.

Figure 1:
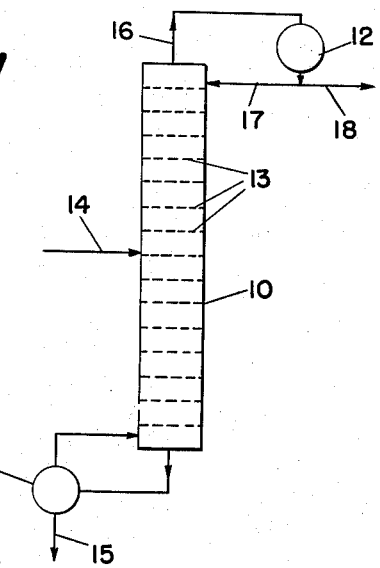
Fig. 1 is a diagrammatic illustration of a distillation column employing sieve plates.

In Fig. 1 there is shown distillation apparatus including a column 10, a reboiler 11 and a condenser 12. The column is supplied with a series of sieve plates 13 which are provided with means (not shown in Fig. 1) for directing liquid flow across a perforated area of each plate and thence downwardly to the next plate. The charge to be fractionated is fed to the column through line 14 and the heavier product is withdrawn from reboiler 11 via line 15. Distillate which issues from the top of the column through line 16 is condensed in condenser 12, a portion being returned through line 17 to the column as reflux while the remainder is withdrawn from line 18 as the lighter product.

Figure 2:
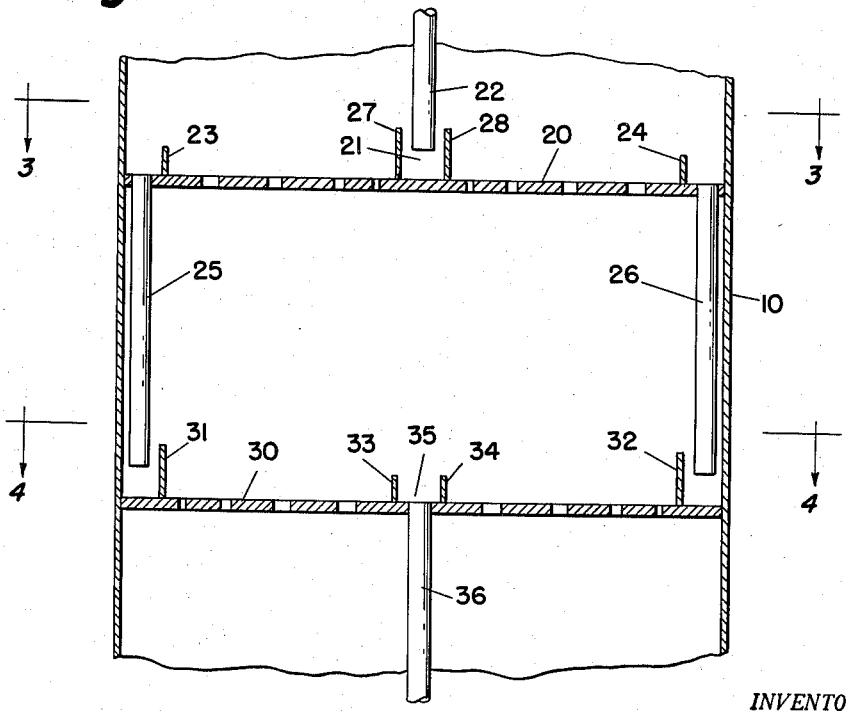
Fig. 2 is a vertical sectional view of a portion of the column containing sieve plates constructed in accordance with the invention.
Figure 3:
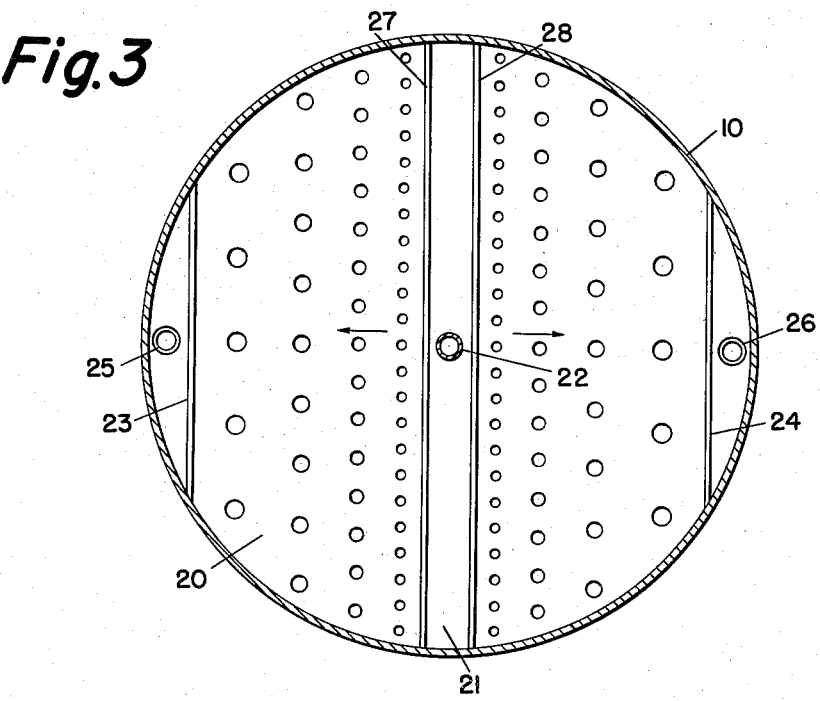
Fig. 3 is a horizontal sectional view of the column taken on line 3—3 of Fig. 2.
Figure 4:
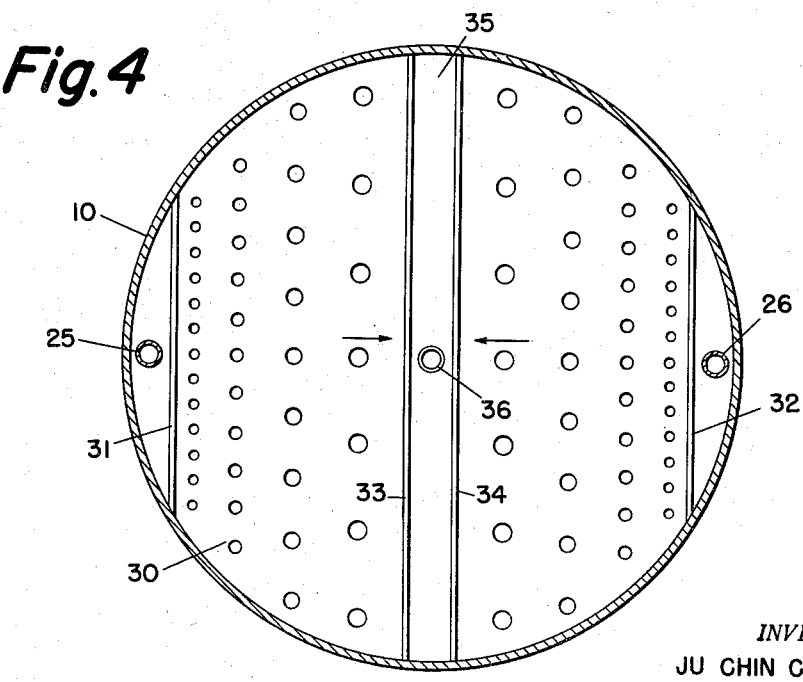
Fig. 4 is a horizontal sectional view of the column taken on line 4—4 of Fig. 2.

With reference now to Figs. 2, 3 and 4, a specific sieve plate design according to the invention is illustrated. Fig. 2 shows two adjacent sieve plates of column 10, Figs. 3 and 4 respectively being plan views of the upper and lower of these plates. The upper plate 20 has a trough 21 formed by inlet weirs 27 and 28 extending across the plate near the center of the column. Liquid is fed to the trough from the next higher plate by downcomer 22. Exit weirs 23 and 24 are provided on plate 20 adjacent opposite sides of the column and parallel to the trough 21 to maintain a liquid head on the plate. Weirs 23 and 24 should be of less height than weirs 27 and 28 to provide for the hydraulic gradient across the plate. Arrows in Fig. 3 show the direction of liquid flow. Downcomer pipes 25 and 26 carry liquid from the exit weirs to the next lower plate 30.

Plate 20 is provided with perforations arranged in rows parallel to trough 21. For purpose of illustration, only four rows of holes are shown but it should be understood that a commercial column may have a large number of such rows, e.g. 100 or more. The holes in the row nearest inlet trough 21 are of smallest diameter and the hole size increases row by row as the exit weirs 23 and 24 are approached. Likewise the pitch or spacing between holes increases in the same direction. It is to be understood that in constructing a commercial column having a large number of rows of holes, the perforation size and pitch need not necessarily vary between each two adjacent rows of holes, as the same general results can be achieved by having groups of rows in each group of which the hole size and spacing is the same with the variation being only from group to group. This latter arrangement has the advantage of decreasing the cost of constructing the perforated plates, since it reduces the number of different size holes which must be formed in the plate.

Figure 3, like the other figures in the drawings, is not to scale. However, let it be assumed that, in the right hand half of the column shown in Figure 3, three imaginary lines parallel to the rows of perforations can be drawn dividing the area between baffle 28 and baffle 24 into four sections, each containing one row of perforations, and each having an area of 10 square feet. Let it be further assumed that the 23 perforations in the row nearest the inlet weir each have a cross sectional area of 0.001 square foot, that the 15 perforations in the next row each have a cross sectional area of 0.002 square foot, that the 9 perforations in the next row each have a cross sectional area of 0.004 square foot, and that the 5 perforations in the row nearest the exit weir each have a cross sectional area of 0.01 square foot. In this case, the ratios of perforated to unperforated area in each of the four sections, reading from right to left, are expressed by the fractions 0.023/9.977, 0.030/9.97, 0.036/9.964, and 0.050/9.95 respectively. Thus, it is seen that this ratio increases in the direction of liquid flow. A similar increase in ratio occurs, in this case from right to left in the drawing, in the left hand half of the column.

The above perforation sizes and arrangements are given merely to illustrate the calculation, and not as examples of suitable sizes and arrangements. In an actual column, generally the perforations are smaller and more numerous.

It is to be understood that the desired increase in the ratio of perforated to unperforated area can be accomplished without increasing the perforation size, and without changing the pitch of the perforations in the rows.

Thus, for example, the increase could be obtained by increasing, in the direction of liquid flow, the number of rows of perforations in each of the imaginary sections of equal area referred to above.

The lower plate 30 of Fig. 2 is constructed generally similar to upper plate 20 except that provision is made for flowing liquid across the plate, as indicated by arrows in Fig. 4, in directions opposite to the flow prevailing on the upper plate. This involves the use of baffles 31 and 32 which serve as inlet weirs and which are higher than baffles 33 and 34 forming trough 35 and functioning as exit weirs. Thus on plate 30 the liquid flow is inwardly from each side to trough 35 and thence through downcomer 36 to the next lower plate. In plate 30, the ratio of perforated to unperforated area increase in the direction of liquid flow toward the trough 35.

With the plates of column 10 constructed as described above for plates 20 and 30, all of the plates in the column will have less tendency for downflow of liquid through different plate areas and the column accordingly will be capable of operating efficiently throughout a wider range of vapor and liquid flow conditions than is possible with conventional sieve plate columns. The specific arrangement of the perforations with respect to sizes and spacings will vary widely and cannot be specified without reference to a particular separation which is to be performed by the column. The best design for any given case will depend upon such factors as the physical properties of the system including liquid viscosities, surface tension and vapor and liquid densities, the size of the column, plate thickness and the operating conditions required to achieve the desired degree of separation. As a general rule, however, the perforation diameter will vary within the range of ⅟₃₂ inch to ½ inch and the perforation pitch will vary within the range of 1½ to 5 times the diameter. Usually the perforation area will be 8 to 15% of the total vapor-liquid contact area of each tray. In many cases it will be desirable to vary the plate design, with respect to perforation size and spacing and also to plate thickness, from bottom to top of the column to compensate for changes throughout the column in viscosity, surface tension and density of the materials being fractionated. In any event, it will be desirable to vary the hole size and spacing across each plate as described herein to minimize the adverse effect of hydraulic gradient.

Another embodiment of the invention is illustrated in Fig. 5 which is a plan view of a perforated plate adapted for flow of liquid entirely across the plate area from left to right. Inlet and outlet weirs are illustrated respectively by baffles 40 and 41, downcomer 42 being provided for conducting the liquid after it has passed across the plate to the next lower plate. Again, the ratio of perforated to unperforated area increases in the direction of liquid flow toward the outlet weir 42.

Figure 6 is another embodiment which provides for outward radial flow of liquid over the perforated plate as indicated by arrows. A centrally positioned weir 50, and several weirs, peripherally located in the column as illustrated by numerals 51, 52, 53 and 54 and associated with downcomers 55, 56, 57 and 58, respectively, are provided. In this case the perforations are made in circular rows parallel to the inlet weir.

Fig. 7 illustrates still another embodiment which involves semi-radial split flow of the liquid as indicated by arrows. Peripherally positioned inlet weirs illustrated by numerals 60 and 61 are provided. Liquid flow from each of these weirs is generally inwardly to exit weirs 62 and 63 associated respectively with downcomers 64 and 65 for flowing the exit liquid to the next lower plate. The plate perforations are arranged in straight rows.

In any of the foregoing constructions, the size and spacing of the perforations may be so designed as to provide uniform ratio, decreasing ratio, or random variation in ratio of perforated to unperforated area in the direction of liquid flow, the size of the individual perforations however increasing in the direction of liquid flow. Such arrangements provide the benefits of the invention in cases where the effect of surface tension is sufficiently great that the smaller size of the perforations near the inlet weir counteracts the tendency for liquid downflow because of the greater liquid head. It is within the ability of a person skilled in the art, in the light of the present specification, to determine whether or not, in a given system, the surface tension effect is sufficiently great to permit obtaining the benefits of the invention without an increase in the ratio of perforated to unperforated area in the direction of liquid flow.

The foregoing embodiments are merely illustrative and numerous other plate designs involving other arrangements of perforations are permissible within the scope of the invention. While the perforations have been illustrated as circular, it will be understood that the invention includes perforations of other shapes such as triangular or square. The provision of baffles serving as inlet weirs is not necessarily essential but is preferred to aid in distributing the flow of incoming liquid. The principles of the invention can be utilized not only for operations involving vapor-liquid contact but also in operations involving liquid-liquid contact such as extraction.

Although the preceding specific description has been directed to sieve plate columns, the invention is applicable to all types of columns in which a tendency for liquid downflow through plate perforations produces, in conventional operation, a limitation on plate capacity.

A mathematical relationship for equalization of liquid downflow tendencies under specified conditions has been stated previously. The derivation of this relationship is as follows:

At a given perforation, the force tending to cause liquid downflow through the perforation is that caused by the liquid head, or $Ah(d_L - d_v)g$, where A is the area of the perforation, $h$ the equivalent quiescent liquid height above the vapor opening, $d_L$ and $d_v$ the liquid and vapor densities respectively, and $g$ the gravitational acceleration constant.

The forces tending to prevent liquid downflow are that exerted by rising vapor and that exerted by surface tension of the liquid. The former is expressed as $\frac{1}{2}fAd_vV^2$, where $f$ is the dragging coefficient, a function of Reynold's number, and V is the linear velocity of vapor flow through the perforation, the other variables being as previously indicated.

In order to avoid liquid downflow, the forces tending to prevent such downflow must equal or exceed the forces tending to cause it. In the case where the density of vapor is negligible compared to that of liquid, and where surface tension is negligible (which is often the case where the temperature is high and the perforations not excessively small), the mathematical relationship may be expressed as follows:

$$hd_L g \leq \frac{1}{2}fd_v V^2 \qquad (1)$$

In order for the tendency for liquid downflow to be just overcome by the forces acting against liquid downflow, both at the row nearest the inlet weir, identified hereinafter by subscript 1, and at the $n$th row from the inlet weir, identified hereinafter by subscript $n$, the ratio of the left hand side of Equation 1 at row $n$ to the left hand side of Equation 1 at row 1 should equal the ratio of the right hand side of Equation 1 at row $n$ to the right hand side of Equation 1 at row 1. When these ratios are equal, the relationship of the left hand side of the equation to the right hand side of the equation is the same at row $n$ as at row 1, and the tendencies for liquid downflow are overcome by equal margins across the plate. The following equation states the desired relationship:

$$\frac{(hd_L g)_n}{(hd_L g)_1} = \frac{(fd_v V^2)_n}{(fd_v V^2)_1}$$

Since $h$, $g$, $f$ and $d_v$ are all either exactly or essentially the same both at the first row and the $n$th row, this equation becomes:

$$\frac{H_n}{H_1} = \frac{V_n^2}{V_1^2} \quad (2)$$

where $H$ is the product of liquid height and density.

The vapor velocities at the first and $n$th rows are related to the ratios of perforated to total area at those rows in the manner demonstrated below:

The volumetric rate of vapor flow at any row of perforations is directly proportional to the product of $V$, the linear vapor velocity, and the ratio of perforated area to total area for that row, and is inversely proportional to the product of the pressure drop undergone by the vapor in passing through that row. From these facts, the following relationship is derived:

$$\frac{R_n V_n}{R_1 V_1} = \frac{\Delta P_1}{\Delta P_n} \quad (3)$$

where $R$ is the ratio of perforated area to the sum of perforated area and unperforated area, and $\Delta P$ is the pressure drop of vapor in passing through the row of perforations.

Pressure drop through perforations in a sieve tray is given by the following equation:

$$\Delta P = C V^2 d_v$$

where $C$ is a constant and $V$ and $d_v$ are as previously identified. Thus, where pressure drop through the liquid is negligible compared to pressure drop through the perforations, Equation 3 becomes:

$$\frac{R_n V_n}{R_1 V_1} = \frac{(C V^2 d_v)_1}{(C V^2 d_v)_n}$$

Since $C$ and $d_v$ are essentially the same both at the first row and the $n$th row, this equation becomes:

$$\frac{R_n V_n}{R_1 V_1} = \frac{V_1^2}{V_n^2}$$

Rearranging this equation, there is obtained:

$$\left[\frac{R_n}{R_1}\right]^{1/3} = \frac{V_1}{V_n}$$

Combining this equation with Equation 2 above, there is obtained:

$$\left[\frac{R_1}{R_n}\right]^{2/3} = \frac{H_n}{H_1}$$

Or, rearranging:

$$\frac{R_n}{R_1} = \left[\frac{H_1}{H_n}\right]^{3/2}$$

Thus, where vapor density, pressure drop through the liquid, and surface tension are sufficiently small to have an unsubstantial effect, the ratio $R$ should increase in the direction of liquid flow, i.e. $R_n/R_1$ should be greater than 1, since $H_1/H_n$ is generally greater than 1 because of the liquid gradient across the plate. Since $R$, the ratio of perforated area to the sum of perforated area, increases in the direction of liquid flow, the ratio of perforated area to unperforated area also increases in that direction.

This application is a continuation-in-part of copending application Serial No. 329,353, filed January 2, 1953 by the present inventor, and now abandoned.

The invention claimed is:

1. A fractionating column comprising a series of sieve plates adapted for upward flow of vapor through the perforations therein, and means for directing liquid flow across a perforated area of each plate with substantially no passage of liquid downwardly through the perforations, and for directing liquid flow from an outlet portion of each plate downwardly to the next plate, each of said plates having a plurality of perforations, each of fixed size, which vary from relatively small to relatively large size in the direction of liquid flow across the plate, whereby the size of each perforation remains constant throughout the range of flow rates of vapor within the capacity of the column.

2. Column according to claim 1 wherein the perforations increase in pitch in said direction.

3. Column according to claim 2 wherein an inlet weir and an exit weir are provided for each plate, and wherein means are provided for flowing liquid from the exit weir of a plate to the inlet weir of the plate next thereheneath.

4. Column according to claim 1 wherein the direction of increasing perforation size and of liquid flow across the plate are both toward the center of the column in one portion of the apparatus and are both away from the center of the column in another portion of the apparatus.

5. A fractionating column comprising a series of perforated plates and means for directing liquid flow across a perforated area of each plate and thence downwardly to the next plate, the ratio of perforated area to unperforated area increasing on each plate in the direction of liquid flow across the plate and of decreasing liquid head, said increase in ratio being constant throughout the range of flow rates of vapor within the capacity of the column and being approximately defined by the equation $$\frac{R_n}{R_1} = \left[\frac{H_1}{H_n}\right]^{3/2}.$$

where $R_n$ is the ratio of perforated area to the sum of perforated area and unperforated area for the $n$th row from the inlet weir, $R_1$ is the ratio of perforated area to the sum of perforated area and unperforated area for the row nearest the inlet weir, $H_1$ is the product of liquid height and density for the liquid on the plate at the row nearest the inlet weir, and $H_n$ is the product of liquid height and density for the liquid on the plate at the $n$th row from the inlet weir.

References Cited in the file of this patent

UNITED STATES PATENTS

| 2,072,382 | Robinson | Mar. 2, 1937 |
| 2,374,950 | Packie et al. | May 1, 1945 |
| 2,564,078 | Pyle | Aug. 14, 1951 |
| 2,570,215 | Dice | Oct. 9, 1951 |
| 2,627,397 | Hendrix | Feb. 3, 1953 |
| 2,658,737 | Nutter | Nov. 10, 1953 |
| 2,698,746 | Reynolds | Jan. 4, 1955 |
| 2,718,900 | Nutter | Sept. 27, 1955 |
| 2,747,849 | Colburn et al. | May 29, 1956 |

OTHER REFERENCES

Petroleum Processing, pages 556–559, April 1953.